United States Defensive Publication [19] (H) [11] T978,004

Gibson [43] Jan. 2, 1979

[54] USE OF CHELATING AGENTS IN THE CONVERSION OF COAL TO LOW-MINERAL CONTENT FUEL

[76] Inventor: William G. Gibson, Fourth Ave., New Eagle, Pa. 15067

[21] Appl. No.: 899,623

[22] Filed: Apr. 24, 1978

[51] Int. Cl.[2] ..... C10G 1/00

[52] U.S. Cl. ..... 208/8

[57] ABSTRACT

An improvement in the production of low mineral content fuel by coal liquefaction processes which yield as a primary product a mixture of liquid and solids a part of which are suspended in the liquid whereby the separation of the suspended solids is facilitated by the addition of an effective amount of a suitable chelating agent to the mixture. The chelating agent is optionally added as a solution of the chelating agent in a suitable solvent and desirably is present in an amount from about 100 to about 150% of the stoichiometric amount required to react with the suspended solids in the mixture.

8 Claims, No Sheets Drawing,

9 Pages Specification

The file of this unexamined application may be inspected and copies thereof may be purchased (849 O.G. 1221, Apr. 9, 1968).